United States Patent
Dong et al.

(10) Patent No.: US 11,136,428 B2
(45) Date of Patent: Oct. 5, 2021

(54) MULTISTAGE AQUEOUS EMULSION POLYMER AND AQUEOUS COATING COMPOSITION FORMED THEREFROM

(71) Applicants: Dow Global Technologies LLC, Midland, MI (US); Rohm and Haas Company, Collegeville, PA (US)

(72) Inventors: Xiangting Dong, Shanghai (CN); Ling Li, Shanghai (CN); Jinyuan Zhang, Shanghai (CN); Wei Cui, Shanghai (CN); Han Liu, Shanghai (CN); Qingwei Zhang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 130 days.

(21) Appl. No.: 16/061,127

(22) PCT Filed: Dec. 21, 2015

(86) PCT No.: PCT/CN2015/098013
§ 371 (c)(1),
(2) Date: Jun. 11, 2018

(87) PCT Pub. No.: WO2017/106994
PCT Pub. Date: Jun. 29, 2017

(65) Prior Publication Data
US 2018/0282462 A1 Oct. 4, 2018

(51) Int. Cl.
| C08F 2/22 | (2006.01) |
| C08F 220/06 | (2006.01) |
| C08F 220/18 | (2006.01) |
| C08F 257/02 | (2006.01) |
| C09D 143/02 | (2006.01) |
| C09D 143/04 | (2006.01) |
| C08F 2/00 | (2006.01) |
| C08F 212/08 | (2006.01) |
| C09D 151/00 | (2006.01) |

(52) U.S. Cl.
CPC ............ *C08F 257/02* (2013.01); *C08F 2/001* (2013.01); *C08F 212/08* (2013.01); *C09D 143/02* (2013.01); *C09D 143/04* (2013.01); *C09D 151/003* (2013.01); *C08F 2/22* (2013.01); *C08F 220/06* (2013.01); *C08F 220/18* (2013.01)

(58) Field of Classification Search
None
See application file for complete search history.

(56) References Cited

U.S. PATENT DOCUMENTS

| 4,325,856 A | 4/1982 | Ishikawa et al. |
| 4,814,373 A | 3/1989 | Frankel et al. |
| 4,916,171 A | 4/1990 | Brown et al. |
| 5,684,078 A | 11/1997 | Pfaffenschlager et al. |
| 6,646,058 B1 | 11/2003 | Koger |
| 7,195,820 B2 | 3/2007 | Hong et al. |
| 7,217,762 B1 * | 5/2007 | Jorgedal ................ C08F 257/02 524/800 |
| 8,501,855 B2 | 8/2013 | Dombrowski et al. |

FOREIGN PATENT DOCUMENTS

| EP | 0348565 A1 * | 1/1990 | ............ C08F 291/00 |
| EP | 0348565 A1 | 1/1990 | |
| EP | 2371870 A1 | 10/2011 | |
| WO | 9833831 A1 | 8/1998 | |
| WO | 2009096925 A1 | 8/2009 | |

OTHER PUBLICATIONS

Marks, G. P. and Clark, A. C., "Emulsion Polymerizations with 2-Acrylamido-2-methylpropanesulfonic Acid". ACS Symposium Series. 2000. vol. 755. Specialty Monomers and Polymers. Chapter 5, pp. 46-53. (Year: 2000).*

* cited by examiner

*Primary Examiner* — Richard A Huhn
(74) *Attorney, Agent, or Firm* — Karl E. Stauss

(57) ABSTRACT

A multistage aqueous emulsion polymer comprising from 88% to 98% by dry weight, based on total dry weight of the multistage aqueous emulsion polymer, of a first polymer core; and from 2% to 12% by dry weight, based on total dry weight of the multistage aqueous emulsion polymer, of a second polymer shell, wherein the first polymer core and the second polymer shell each independently comprises, as polymerized units, one or more ethylenically unsaturated nonionic monomers, wherein the second polymer shell further comprises, as polymerized units, from 20% to 60% by dry weight, based on total dry weight of the second polymer shell, of an acid monomer, wherein said acid monomer is, as polymerized units, from 1.1% to 4.2% by dry weight, based on total dry weight of the multistage aqueous emulsion polymer. An aqueous coating composition comprising said multistage aqueous emulsion polymer.

13 Claims, No Drawings

MULTISTAGE AQUEOUS EMULSION POLYMER AND AQUEOUS COATING COMPOSITION FORMED THEREFROM

FIELD OF THE INVENTION

This invention relates to a multistage aqueous emulsion polymer. This invention also relates to an aqueous coating composition comprising the same.

INTRODUCTION

Coating formulations may be prepared by conventional coating preparation techniques, which are well known to those skilled in the art. Typically, the formulations are prepared by a two-step process.

First, a grind phase is prepared by mixing dry pigments with other grind phase components under constant high-shear agitation. A hydrophilic dispersant is needed to disperse the pigments and/or extenders. This part of the process is designed to effectively wet and dis-agglomerate the dry pigments and stabilize them in an aqueous dispersion.

The second step of the process is commonly referred to as a letdown phase in which the viscous grind is mix diluted with the remaining formulation components, which are generally less viscous than the grind mix. Typically, binders, pre-dispersed pigments, and other materials that only require mixing are incorporated during the letdown phase. Typically, in the field of architectural coatings, the high-shear mixer or agitator blade has to be replaced with a low-shear mixer or agitator blade. The letdown phase may be done either by sequentially adding the letdown components into a vessel containing the grind mix, or by adding the grind mix into a vessel containing a premix of latex polymer and other letdown components, followed by sequential additions of the final letdown components. In either case, components are stirred with agitator blades at a low speed during the admixture.

The aforementioned two-step coating preparation process is complicated and time-consuming due to necessities of the addition of the dispersants in the grind phase and the binders in the letdown phase, and the change of agitator blades being used in the letdown phase.

It is therefore desired to provide an emulsion polymer to simplify the coating preparation process. Such emulsion polymer could serve both as a grind dispersant and a letdown binder. With such emulsion polymer, high-shear blades need not be replaced by low-shear blades. It is also desired to provide an aqueous coating composition containing such emulsion polymer with desired coating performance, such as good mechanical stability and higher volume of solids than conventional coating.

SUMMARY OF THE INVENTION

The present invention provides a novel multistage aqueous emulsion polymer which may simplify the coating preparation process, and an aqueous coating composition comprising such multistage emulsion polymer with acceptable coating performance, such as good mechanical stability and higher volume of solids.

In a first aspect of the present invention there is provided a multistage aqueous emulsion polymer comprising from 88% to 98% by dry weight, based on total dry weight of the multistage aqueous emulsion polymer, of a first polymer core; and from 2% to 12% by dry weight, based on total dry weight of the multistage aqueous emulsion polymer, of a second polymer shell, wherein the first polymer core and the second polymer shell each independently comprises, as polymerized units, one or more ethylenically unsaturated nonionic monomers, wherein the second polymer shell further comprises, as polymerized units, from 20% to 60% by dry weight, based on total dry weight of the second polymer shell, of an acid monomer, wherein said acid monomer is, as polymerized units, from 1.1% to 4.2% by dry weight, based on total dry weight of the multistage aqueous emulsion polymer.

In a second aspect of the present invention there is provided an aqueous coating composition comprising such multistage aqueous emulsion polymer.

DETAILED DESCRIPTION OF THE INVENTION

The multistage aqueous emulsion polymer comprises from 88% to 98%, preferably from 91% to 98%, and more preferably from 93% to 96%, by dry weight, based on total dry weight of the multistage aqueous emulsion polymer, of a first polymer core, and from 2% to 12%, preferably from 2% to 9%, and more preferably from 4% to 7%, by dry weight, based on total dry weight of the multistage aqueous emulsion polymer, of a second polymer shell.

By "multistage aqueous emulsion polymer" herein is meant an emulsion polymer prepared by the sequential addition of two or more different monomer compositions. By "first polymer" and "second polymer" herein are meant two polymers having different compositions regardless of the order in which they were prepared in a multistage emulsion polymerization process. By "first-stage polymer" herein is meant the emulsion polymer of the first polymer and second polymer that is formed first; by "second-stage polymer" herein is meant a polymer which is formed in the presence of the first-stage polymer. By "core" herein is meant alkali insoluble layers of the multistage aqueous emulsion polymer; by "shell" herein is meant alkali soluble layers beyond the alkali insoluble layers of the multistage aqueous emulsion polymer.

The first polymer core and the second polymer shell each independently comprises, as polymerized units, one or more ethylenically unsaturated nonionic monomers.

As used herein, the term "nonionic monomers" refers to monomers that do not bear an ionic charge between pH=1-14. Suitable examples of the ethylenically unsaturated nonionic monomers include alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, and any combinations thereof; (meth)acrylonitrile; (meth)acrylamide; amino-functional and ureido-functional monomers such as hydroxyethyl ethylene urea methacrylate; monomers bearing acetoacetate-functional groups such as acetoacetoxyethyl methacrylate; monomers bearing carbonyl-containing groups such as diacetone acrylamide; ethylenically unsaturated monomers having a benzene ring such as styrene and substituted styrenes; butadiene; α-olefins such as ethylene, propylene, and 1-decene; vinyl acetate, vinyl butyrate, vinyl versatate and other vinyl esters; vinyl monomers such as vinyl chloride and vinylidene chloride; glycidyl (meth)acrylate; and any combinations thereof.

In a preferred embodiment, the ethylenically unsaturated nonionic monomer is selected from styrene, $C_2$-$C_{12}$ alkyl esters of (meth)acrylic acids, derivatives thereof, and any combinations thereof.

The second polymer shell further comprises, as polymerized units, from 20% to 60%, preferably from 25% to 55%, and more preferably from 30% to 50%, by dry weight, based on total dry weight of the second polymer shell, of an acid monomer.

The first polymer core may also comprise, as polymerized units, from 0.01% to 5%, preferably from 0.5% to 3%, and more preferably from 1% to 2%, by dry weight, based on total dry weight of the first polymer core, of an acid monomer.

Acid monomers include carboxylic acid monomers such as acrylic acid, methacrylic acid, crotonic acid, itaconic acid, fumaric acid, maleic acid, and maleic anhydride; and sulfur- and phosphorous-containing acid monomers. The acid monomers are preferably carboxylic acid monomers. More preferably, the acid monomer is (meth)acrylic acid.

The first polymer core has an acid number from 0 to 32, preferably from 3 to 19. The second polymer shell has an acid number from 130 to 390, preferably from 162 to 358. The acid number herein was calculated by determining the number of milliequivalents of acid per gram in the first polymer based only upon the copolymerized monoethylenically-unsaturated acid monomer in the first polymer, and multiplying by the molecular weight of potassium hydroxide.

The first polymer core may further comprise, as polymerized units, from 0.01% to 5%, preferably from 0.2% to 3%, and more preferably from 0.3% to 1%, by dry weight, based on total dry weight of the first polymer core, of a stabilizer monomer.

Suitable examples of the stabilizer monomers include sodium styrene sulfonate, sodium vinyl sulfonate, 2-acrylamido-2-methylpropanesulfonic acid, acrylamide, and any combinations thereof.

The calculated number average molecular weight, Mn, of the second polymer shell is from 1000 to 10000, preferably from 2000 to 8000, and more preferably from 3000 to 5000.

In the multistage emulsion polymerization process at least two stages different in composition are formed in sequential fashion. In a preferred multistage emulsion polymerization process, the first polymer is a first-stage polymer and the second polymer is a second-stage polymer, i.e., the second polymer is formed by emulsion polymerization in the presence of the first emulsion polymer.

The polymerization techniques used to prepare such multistage aqueous polymers are well known in the art such as disclosed in U.S. Pat. Nos. 4,325,856 and 4,814,373. Conventional surfactants may be used such as anionic and/or nonionic emulsifiers such as alkali metal or ammonium alkyl sulfates, alkyl sulfonic acids, fatty acids, and oxyethylated alkyl phenols. The amount of surfactants used is usually 0.1% to 6% by dry weight, based on the dry weight of total monomers. Either thermal or redox initiation processes may be used. Conventional free radical initiators may be used such as hydrogen peroxide, t-butyl hydroperoxide, t-amyl hydroperoxide, ammonium and/or alkali persulfates typically at a level of 0.01% to 3.0% by weight, based on the weight of total monomers. Redox systems using the same initiators coupled with a suitable reductant such as sodium sulfoxylate formaldehyde, sodium hydrosulfite, isoascorbic acid, hydroxylamine sulfate and sodium bisulfite may be used at similar levels, optionally in combination with metal ions such as iron and copper, optionally further including complexing agents for the metal. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as for example, free radical initiators, oxidants, reducing agents, chain transfer agents, neutralizers, surfactants, and dispersants may be added prior to, during, or subsequent to any of the stages.

The aqueous coating composition is prepared by techniques which are well known in the coatings art except that the multistage emulsion polymer is added in the grind phase to serve both as a dispersant which used to be added in the grind phase and a binder which used to be added in the letdown phase, and the high-shear blades need not be replaced by low-shear blades in the letdown phase. The aqueous coating composition may contain, in addition to the multistage emulsion polymer and optional pigment(s), film-forming or non-film-forming solution or emulsion polymers in an amount of 0% to 300% by weight of the multistage emulsion polymer, and conventional coatings adjuvants such as emulsifiers, coalescing agents, antifreezes, curing agents, neutralizers, thickeners, rheology modifiers, wetting agents, biocides, antifoaming agents, UV absorbers, fluorescent brighteners, light or heat stabilizers, biocides, chelating agents, dispersants, colorants, waxes, water-repellants, and anti-oxidants.

In the present invention, the technical features in each preferred technical solution and more preferred technical solution can be combined with each other to form new technical solutions unless indicated otherwise. For briefness, the specification omits the descriptions for these combinations. However, all the technical solutions obtained by combining these technical features should be deemed as being literally described in the present specification in an explicit manner.

In order to further illustrate this invention the following examples are presented. However, it should be understood that the invention is not limited to these illustrative examples.

| Abbreviations | Compounds |
| --- | --- |
| AA | acrylic acid |
| ALMA | allyl methacrylate |
| AM | acrylamide |
| AMPS | 2-acrylamido-2-methylpropanesulfonic acid |
| APS | ammonia persulphate |
| BA | butyl acrylate |
| DI water | deionized water |
| EDTA | ethylenediaminetetraacetic acid tetrasodium salt |
| IAA | isoascorbic acid |
| MAA | methacrylic acid |
| MMP | methylmercaptopropionate |
| n-DDM | n-dodecylmercaptan |
| PEM | phosphoethyl methacrylate (65% active) |
| SBS | sodium bisulfite |
| SSS | sodium styrene sulfonate |
| ST | styrene |
| SVS | sodium vinyl sulfonate |
| t-BHP | t-butyl hydrogen peroxide (70% active) |
| 2-EHA | 2-ethylhexyl acrylate |

EXAMPLES

I. Raw Materials

| Material | Available from |
| --- | --- |
| AMP-95 base | ANGUS Chemie GmbH |
| ASP 170 extender | BASF |
| CC-700 extender | Guangfu Building Materials (Shanghai) Co., Ltd. |
| DB-80 extender | Guangfu Building Materials (Shanghai) Co., Ltd. |
| DISPONIL LDBS 19 surfactant with 19% active ("A-19") | BASF |
| NATROSOL 250 HBR thickener | Hercules Incorporated |
| NOPCO NXZ defoamer | SAN NOPCO Ltd. |
| OROTAN ™ 1288 dispersant | The Dow Chemical Company |
| ROCIMA ™ 361 biocide | The Dow Chemical Company |
| ROPAQUE ™ Ultra E opaque polymer | The Dow Chemical Company |
| SILQUEST A-171 vinyltrimethoxysilane ("A-171") | Momentive Performance Materials Inc. |
| TERGITOL ™ 15-S-40 surfactant with 70% active ("15-S-40") | The Dow Chemical Company |
| TEXANOL coalescent | Eastman Chemical Company |
| TI-PURE R-706 pigment | DuPont |

II. Test Methods

1. Brookfield Viscosity 132 g emulsion polymer, 132 g CC-700 extender, 21 g TEXANOL coalescent, and 15 g water were mixed in a 500 ml container equipped with a COWLES mixer, and stirred at 2500 rmp for 1 hour. The mixture was prepared and equilibrated through a 4# spindle at 6 rpm for 10 second to 40° C., tested and recorded for viscosity by a Brookfield digital viscometer at model: LVDV-I+.

2. Water Resistance

Drawdown of emulsion polymer was made with a 100 µm Bird Film Applicator on a BYKO-chart PA-2810 of BYK-Gardner GmbH, and was then allowed for drying for 1 day in a constant temperature room (25° C., 50% R.H.). The clear film was immersed horizontally into DI water for 24 hours and observed to check whether blistering occurs.

III. Sample Preparations

1. Preparation of Inventive Multistage Aqueous Emulsion Polymers 1 to 9 (Inv. MEPs 1 to 9)

Inv. MEP 1: Monomer emulsion #1 was prepared by mixing 400.9 g DI water, 88.8 g A-19, 669.3 g BA, 873.8 g ST, 32.0 g AA, 4.9 g A-171, 4.0 g PEM, and 5.7 g SSS. Monomer emulsion #2 was prepared by mixing 8.2 g DI water, 1.8 g A-19, 14.6 g ST, 17.9 g MAA, and 4.4 g MMP. A flask was charged with 727.8 g DI water and 8.9 g A-19, and then brought to 88° C. under a nitrogen purge. Thereafter, the flask was charged with a solution of 0.025 g ferrous sulfate heptahydrate and 0.25 g EDTA in 5.0 g DI water, and a solution of 5.8 g APS in 18.0 g DI water. Monomer emulsion #1 was then fed to the flask at a rate of 17.6 g/min A mixture of 2.3 g of APS in 64.0 g DI water and a mixture of 2.5 g SBS in 64.0 g DI water were fed to the flask at a rate of 0.51 g/min simultaneously. After the completion of addition of Monomer emulsion #1, Monomer emulsion #2 was then fed to the flask at a rate of 11.0 g/min After the completion of the feed, the line was rinsed and the contents of the flask were allowed to stir for 10 minutes at 85-88° C. Then the flask was cooled to 75° C. A solution of 4.9 g t-BHP in 41.0 g DI water and a solution of 2.3 g IAA in 46.0 g DI water were then fed into the flask over a period of 45 minutes to reduce residual monomer. The polymer was then neutralized to pH=7.4 with $NH_4OH$, and cooled to room temperature. The polymer had a particle size of 110 nm and a volume of solids of 48.8%. The polymer was then filtered to remove any coagulum.

As a result, the first polymer core and the second polymer shell in Inv. MEP 1 prepared using the above process has a 98/2 weight ratio.

Inv. MEPs 2 to 9 were prepared by using the same procedure as outlined for Inv. MEP 1, except for the amounts of different components being used in making Monomer emulsions #1 and Monomer emulsions #2. The amounts of various components (in grams) to make Monomer emulsions #1 and Monomer emulsions #2, and the first polymer core/second polymer shell weight ratios for Inv. MEPs 1 to 9 are shown in TABLE 1 below.

TABLE 1

| | Inv. MEP 1 | Inv. MEP 2 | Inv. MEP 3 | Inv. MEP 4 | Inv. MEP 5 | Inv. MEP 6 | Inv. MEP 7 | Inv. MEP 8 | Inv. MEP 9 |
| --- | --- | --- | --- | --- | --- | --- | --- | --- | --- |
| Monomer emulsion #1 | | | | | | | | | |
| DI water | 400.9 g | 388.6 g | 388.6 g | 372.3 g | 388.6 g | 388.6 g | 360.0 g | 360.0 g | 388.6 g |
| A-19 | 87.8 g | 85.2 g | 85.2 g | 81.6 g | 85.2 g | 85.2 g | 78.9 g | 78.9 g | 85.2 g |
| BA | 669.3 g | 648.8 g | 648.8 g | 621.4 g | 648.8 g | 648.8 g | 601.0 g | 601.0 g | 648.8 g |
| ST | 873.8 g | 847.0 g | 847.0 g | 811.3 g | 847.0 g | 847.0 g | 784.6 g | 784.6 g | 855.5 g |
| AA | 32.0 g | 31.0 g | 31.0 g | 31.0 g | 31.0 g | 31.0 g | 28.7 g | 28.7 g | 31.0 g |
| A-171 | 4.9 g | 4.8 g | 4.8 g | 4.6 g | 4.8 g | 4.8 g | 4.4 g | 4.4 g | 0 g |
| PEM | 4.0 g | 3.8 g | 3.8 g | 3.7 g | 3.8 g | 3.8 g | 3.6 g | 3.6 g | 0 g |
| SSS | 5.7 g | 5.6 g | 5.6 g | 5.4 g | 5.6 g | 5.6 g | 5.2 g | 5.2 g | 5.6 g |
| Monomer emulsion #2 | | | | | | | | | |
| DI water | 8.2 g | 20.5 g | 20.5 g | 36.8 g | 20.5 g | 20.5 g | 49.1 g | 49.1 g | 20.5 g |
| A-19 | 1.8 g | 4.5 g | 4.5 g | 8.1 g | 4.5 g | 4.5 g | 10.8 g | 10.8 g | 4.5 g |
| ST | 14.6 g | 60.8 g | 44.6 g | 102.1 g | 36.5 g | 36.5 g | 136.1 g | 126.4 g | 44.6 g |
| MAA | 17.9 g | 20.4 g | 36.7 g | 44.0 g | 44.8 g | 44.8 g | 58.7 g | 68.5 g | 36.7 g |
| MMP | 4.4 g | 11.0 g | 3.3 g | 5.8 g | 2.0 g | 1.0 g | 7.8 g | 7.8 g | 3.2 g |
| First polymer core/second polymer shell weight ratio | | | | | | | | | |
| | 98/2 | 95/5 | 95/5 | 91/9 | 95/5 | 95/5 | 88/12 | 88/12 | 95/5 |

2. Preparation of Comparative Multistage Aqueous Emulsion Polymers 1 to 4 (Comp. MEPs 1 to 4)

Comp. MEPs 1 to 4 were prepared by using the same procedure as outlined for Inv. MEP 1, except for the amounts of different components being used in making Monomer emulsions #1 and Monomer emulsions #2. The amounts of various components (in grams) to make Monomer emulsions #1 and Monomer emulsions #2, and the first polymer core/second polymer shell weight ratios for Comp. MEPs 1 to 4 are shown in TABLE 2 below.

TABLE 2

|  | Comp. MEP 1 | Comp. MEP 2 | Comp. MEP 3 | Comp. MEP 4 |
|---|---|---|---|---|
| Monomer emulsion #1 | | | | |
| DI water | 405.1 g | 388.6 g | 351.8 g | 368.2 g |
| A-19 | 88.8 g | 85.2 g | 77.1 g | 80.7 g |
| BA | 676.1 g | 648.8 g | 587.3 g | 614.6 g |
| ST | 882.7 g | 847.0 g | 766.8 g | 802.4 g |
| AA | 32.3 g | 31.0 g | 28.0 g | 29.3 g |
| A-171 | 4.9 g | 4.8 g | 4.3 g | 4.5 g |
| PEM | 4.0 g | 3.8 g | 3.5 g | 3.6 g |
| SSS | 5.8 g | 5.6 g | 5.0 g | 5.3 g |
| Monomer emulsion #2 | | | | |
| DI water | 4.1 g | 20.5 g | 57.3 g | 40.9 g |
| A-19 | 0.9 g | 4.5 g | 12.6 g | 9.0 g |
| ST | 7.3 g | 66.4 g | 170.2 g | 89.1 g |
| MAA | 9.0 g | 14.7 g | 57.1 g | 73.4 g |
| MMP | 2.2 g | 11.0 g | 5.7 g | 6.5 g |
| First polymer core/second polymer shell weight ratio | | | | |
|  | 99/1 | 95/5 | 86/14 | 90/10 |

3. Preparation of Inventive Aqueous Coating Compositions 1 to 4 Inventive Composition 1

Grind Phase: 260.0 g water, 10.0 g propylene glycol, 2.0 g 15-S-40, 3.0 g NATROSOL 250 HBR thickener, 1.0 g AMP-95 base, 1.0 g NOPCO NXZ defoamer, 89.0 g Inv. MEP 3, 100.0 g DB-80 extender, 40.0 g ASP 170 extender, 35.0 g TI-PURE R-706 pigment, 310.0 g CC-700 extender, and 2.0 g ROCIMA™ 361 biocide were added into a tank sequentially and stirred with a COWLES mixer under high speed. The grind phase components were then well dispersed.

Letdown Phase: After the grind phase, the COWLES mixer was adjusted to low speed. 136.47 g water, 10.0 g TEXANOL coalescent, and 0.5 g NOPCO NXZ defoamer were then added to the tank and stirred to control minimum film forming temperature and appropriate viscosity.

Inventive Compositions 2 and 3

Inventive Compositions 2 and 3 were prepared by using the same procedure as outlined for Inventive Composition 1, except that Inventive Composition 2 used 89.5 g Inv. MEP 2 instead of 89.0 g Inv. MEP 3, and Inventive Composition 3 used 89.0 g Inv. MEP 9 instead of 89.0 g Inv. MEP 3.

Inventive Composition 4

Grind Phase: 180.0 g water, 10.0 g propylene glycol, 2.0 g 15-S-40, 3.0 g NATROSOL 250 HBR thickener, 1.0 g AMP-95 base, 1.0 g NOPCO NXZ defoamer, 89.0 g Inv. MEP 3, 100.0 g DB-80 extender, 40.0 g ASP 170 extender, 35.0 g TI-PURE R-706 pigment, 310.0 g CC-700 extender, and 2.0 g ROCIMA™ 361 biocide were added into a tank sequentially and stirred with a COWLES mixer under high speed. The grind phase components were then well dispersed.

Letdown Phase: After the grind phase, the COWLES mixer was adjusted to low speed. 60.0 g water, 10.0 g TEXANOL coalescent, and 0.5 g NOPCO NXZ defoamer were then added to the tank and stirred to control minimum film forming temperature and appropriate viscosity.

During the preparation of Inventive Compositions 1 to 4, no separate hydrophilic dispersant or binder was added and the COWLES mixer was not replaced with a low-shear mixer in the letdown phase. Different mixers, dispersants and binders used in the grind phase and the letdown phase for Inventive Compositions 1 to 4 are listed in Table 5 below.

4. Preparation of Comparative Aqueous Coating Compositions 1 to 4

Comparative single-stage emulsion polymer dispersants and binders are prepared for preparation of comparative blend emulsion polymer and comparative aqueous coating compositions.

Dispersant 1

Monomer emulsion was prepared by mixing 70.2 g DI water, 16.6 g A-19, 79.3 g ST, 97.5 g MAA, and 4.4 g MMP. The components and the amounts being used in making DISPERSANT 1 is the same as the components and the amounts being used in making Monomer emulsion #2 for Inv. MEP 5.

A flask was charged with 281.0 g DI water and 4.9 g A-19, and then brought to 83° C. under a nitrogen purge. Thereafter, the flask was charged with a solution of 1.14 g APS in 12.0 g DI water. The monomer emulsion was then fed to the flask at a rate of 5.9 g/min for 46 minutes. A mixture of 0.48 g of APS in 20.0 g DI water and a mixture of 0.48 g SBS in 20.0 g DI water were fed to the flask at a rate of 0.38 g/min for 52 minutes simultaneously. After the completion of the feed, the line was rinsed and the contents of the flask were allowed to stir for 10 minutes at 80-83° C. Then the flask was cooled to 75° C. A solution of 0.015 g ferrous sulfate heptahydrate in 5.0 g DI water was added to the flask. Then a solution of 0.36 g t-BHP in 6.0 g DI water and a solution of 0.2 g IAA in 6.0 g DI water were then fed into the flask over a period of 40 minutes to reduce residual monomer. The polymer was then neutralized to pH=3.6 with sodium acetate solution, and cooled to room temperature. The polymer had a particle size of 243 nm and a volume of solids of 28.1%. The polymer was filtered to remove any coagulum.

Dispersants 2 and 3

DISPERSANTS 2 and 3 were prepared by using the same procedure as outlined for DISPERSANT 1, except for the amounts of different components being used in making monomer emulsion. The components and the amounts being used in making DISPERSANT 2 is the same as the components and the amounts being used in making Monomer emulsion #2 for Inv. MEP 3. The components and the amounts being used in making DISPERSANT 3 is the same as the components and the amounts being used in making Monomer emulsion #2 for Inv. MEP 2.

The amounts of various components (in grams) to make monomer emulsions, ST/MAA weight ratios, and calculated Mn for DISPERSANTS 1 to 3 are shown in TABLE 3 below.

TABLE 3

|  | DISPERSANT 1 | DISPERSANT 2 | DISPERSANT 3 |
|---|---|---|---|
| DI water | 70.2 g | 70.2 g | 70.2 g |
| A-19 | 16.6 g | 16.6 g | 16.6 g |
| ST | 79.3 g | 96.9 g | 132.2 g |
| MAA | 97.5 g | 79.8 g | 44.3 g |
| MMP | 4.4 g | 7.0 g | 23.9 g |

TABLE 3-continued

|  | DISPERSANT 1 | DISPERSANT 2 | DISPERSANT 3 |
|---|---|---|---|
| ST/MAA weight ratio | 45/55 | 55/45 | 75/25 |
| Calculated Mn | 5000 | 3000 | 1000 |

Binder 1

Monomer emulsion was prepared by mixing 409.1 g DI water, 89.6 g surfactant A-19, 682.9 g BA, 891.5 g ST, 32.6 g AA, 5.0 g A-171, 4.0 g PEM, and 5.9 g SSS. The components and the amounts being used in making BINDER 1 is the same as the components and the amounts being used in making Monomer emulsion #1 for Inv. MEP 3 and Inv. MEP 5.

A flask was charged with 727.8 g DI water and 8.9 g A-19, and then brought to 88° C. under a nitrogen purge. Thereafter, the flask was charged with a solution of 0.025 g ferrous sulfate heptahydrate, 0.25 g EDTA in 5.0 g DI water and 5.8 g APS solution in 18.0 g DI water. The monomer emulsion was then fed to the flask at a rate of 17.6 g/min. A mixture of 2.3 g of APS in 64.0 g DI water and a mixture of 2.5 g SBS in 64.0 g DI water were fed to the flask at a rate of 0.51 g/min simultaneously. After the completion of the feed, the line was rinsed and the contents of the flask were allowed to stir for 10 minutes at 85-88° C. Then the flask was cooled to 75° C. A solution of 4.9 g t-BHP in 41.0 g DI water and a solution of 2.3 g IAA in 46.0 g DI water were then fed into the flask over a period of 45 minutes to reduce residual monomer. The polymer was then neutralized to pH=8.6 with $NH_4OH$, and cooled to room temperature. The polymer had a particle size of 123 nm and a volume of solids of 47.8%. The polymer was then filtered to remove any coagulum.

Binder 2

BINDER 2 was prepared by using the same procedure as outlined for BINDER 1, except for a different monomer emulsion being prepared by mixing 409.1 g DI water, 89.6 g A-19, 682.9 g BA, 900.5 g ST, 32.6 g AA, and 5.9 g SSS. The components and the amounts being used in making BINDER 2 is the same as the components and the amounts being used in making Monomer emulsion #1 for Inv. MEP 9.

The amounts of various components (in grams) to make monomer emulsions for BINDER 1 and BINDER 2 are shown in TABLE 4 below.

TABLE 4

|  | BINDER 1 | BINDER 2 |
|---|---|---|
| DI water | 409.1 g | 409.1 g |
| A-19 | 89.6 g | 89.6 g |
| BA | 682.9 g | 682.9 g |
| ST | 891.5 g | 900.5 g |
| AA | 32.6 g | 32.6 g |
| A-171 | 5.0 g | 0 g |
| PEM | 4.0 g | 0 g |
| SSS | 5.9 g | 5.9 g |

Comparative Composition 1

Grind Phase: 260.0 g water, 10.0 g propylene glycol, 2.0 g 15-S-40, 3.0 g NATROSOL 250 HBR thickener, 1.0 g AMP-95 base, 1.0 g NOPCO NXZ defoamer, 5.16 g DISPERSANT 2, 85.0 g BINDER 1, 100.0 g DB-80 extender, 40.0 g ASP 170 extender, 35.0 g TI-PURE R-706 pigment, 310.0 g CC-700 extender, and 2.0 g ROCIMA™ 361 biocide were added into a tank sequentially and stirred with a COWLES mixer under high speed. The grind phase components were then well dispersed.

Letdown Phase: After the grind phase, the COWLES mixer was adjusted to low speed. 135.3 g water, 10.0 g TEXANOL coalescent and 0.5 g NOPCO NXZ defoamer were then added to the tank and stirred at low speed dispersion to control minimum film forming temperature and appropriate viscosity.

Comparative Compositions 2 and 3

Comparative Compositions 2 and 3 were prepared by using the same procedure outlined for Comparative Composition 1, except that Comparative Composition 2 used 5.11 g DISPERSANT 3 instead of 5.16 g DISPERSANT 2, and Comparative Composition 3 used 5.07 DISPERSANT 2 instead of 5.16 g DISPERSANT 2, and 85.0 g BINDER 2 instead of 85.0 g BINDER 1.

Comparative Composition 4

Grind Phase: 260.0 g water, 10.0 g propylene glycol, 2.0 g 15-S-40, 3.0 g NATROSOL 250 HBR thickener, 1.0 g AMP-95 base, 1.0 g NOPCO NXZ defoamer, 4.3 g OROTAN 1288 dispersant, 100.0 g DB-80 extender, 40.0 g ASP 170 extender, 35.0 g TI-PURE R-706 pigment, 310.0 g CC-700 extender, and 2.0 g ROCIMA™ 361 biocide were added into a tank sequentially and stirred with a COWLES mixer under high speed. The grind phase components were then well dispersed.

Letdown Phase: After the grind phase, the COWLES mixer was replaced with a low-shear mixer. 60.0 g water, 85.0 g BINDER 1, 10.0 g TEXANOL coalescent, and 0.5 g NOPCO NXZ defoamer were then added to the tank and stirred at low speed dispersion to control minimum film forming temperature and appropriate viscosity.

Different mixers, dispersants and binders used in the grind phase and the letdown phase for Comparative Compositions 1 to 4 are listed in Table 5 below as well.

TABLE 5

| Coating Compositions | Grind Phase | | | Letdown Phase | | Total |
|---|---|---|---|---|---|---|
|  | Mixer | Dispersant | Binder | Mixer | Binder | PVC |
| Inventive Composition 1 | COWLES mixer | 89.0 g Inv. MEP 3 | | COWLES mixer | No binder | 82.2% |
| Inventive Composition 2 | COWLES mixer | 89.5 g Inv. MEP 2 | | COWLES mixer | No binder | 82.2% |
| Inventive Composition 3 | COWLES mixer | 89.0 g Inv. MEP 9 | | COWLES mixer | No binder | 82.7% |
| Inventive Composition 4 | COWLES mixer | 89.0 g Inv. MEP3 | | COWLES mixer | No binder | 82.2% |
| Comparative Composition 1 | COWLES mixer | 5.16 g DISPERSANT 2 | 85.0 g BINDER 1 | COWLES mixer | No binder | 82.9% |

TABLE 5-continued

| Coating | Grind Phase | | | Letdown Phase | | Total |
|---|---|---|---|---|---|---|
| Compositions | Mixer | Dispersant | Binder | Mixer | Binder | PVC |
| Comparative Composition 2 | COWLES mixer | 5.11 g DISPERSANT 3 | 85.0 g BINDER 1 | COWLES mixer | No binder | 82.9% |
| Comparative Composition 3 | COWLES mixer | 5.07 g DISPERSANT 2 | 85.0 g BINDER 2 | COWLES mixer | No binder | 82.3% |
| Comparative Composition 4 | COWLES mixer | 4.31 g OROTAN 1288 dispersant | No binder | Low-shear mixer | 85.0 g BINDER 1 | 82.8% |

IV. Results

Since the multistage aqueous emulsion polymer of the present invention could serve both as a dispersant and a binder, Brookfield viscosity was measured to evaluate its dispersing efficiency, and water resistance was measured to evaluate its resistance to blistering. TABLE 6 below summaries the evaluation of the aqueous emulsion polymers. As TABLE 6 illustrates, all inventive multistage aqueous emulsion polymers (i.e., Inv. MEPs 1 to 9) meet performance requirement, and exhibit good dispersing capacity and good water resistance (no blistering).

Comp. MEP 1 has a poor dispersing capacity (gelled) due to a low level of second polymer shell/emulsion polymer ratio (1%, lower than 2%) and a low level of acid monomer/emulsion polymer ratio (0.6%, lower than 1.1%).

Comp. MEP 2 has a poor dispersing capacity (gelled) due to a low level of acid monomer/emulsion polymer ratio (0.9%, lower than 1.1%) and a low level of acid monomer/second polymer shell ratio (18%, lower than 20%), although its second polymer shell/emulsion polymer ratio (5%) is within the range from 2% to 12%.

Comp. MEP 3 has a poor water resistance (blistered) due to a high level of second polymer shell/emulsion polymer ratio (14%, greater than 12%), although its acid monomer/emulsion polymer ratio (3.5%) is within the range from 1.1% to 4.2%.

Comp. MEP 4 has a poor water resistance (blistered) due to a high level of acid monomer/emulsion polymer ratio (4.5%, greater than 4.2%), although its second polymer shell/emulsion polymer ratio (10%) is within the range from 2% to 12%.

Comp. Blend 1 was a mixture of DISPERSANT 1 (5% based on weight of solid content) and BINDER 1 (95% based on weight of solid content), and the pH level was adjusted to 7.6. The components and the weight ratios being used in making monomer emulsion for DISPERSANT 1 is the same as the components and the weight ratios being used in making Monomer emulsion #2 for Inv. MEP 5. The components and the weight ratios being used in making monomer emulsion for BINDER 1 is the same as the components and the weight ratios being used in making Monomer emulsion #1 for Inv. MEP 5. When comparing Comp. Blend 1 to Inv. MEP 5, Inv. MEP 5 shows that a multistage aqueous emulsion polymer has a much better dispersing capacity than Comp. Blend 1 as a mixture.

In summary, the second polymer shell/emulsion polymer ratio, acid monomer/second polymer shell ratio and acid monomer/emulsion polymer ratio should be at suitable ranges in order to well balance the dispersing efficiency and water resistance of emulsion polymer.

TABLE 6

Evaluation of Aqueous Emulsion Polymers

| | Second polymer shell ratio* | MAA ratio A** | MAA ratio B*** | Calculated Mn of the second polymer shell | Blistering | Brookfield viscosity (cps) |
|---|---|---|---|---|---|---|
| Inv. MEP 1 | 2% | 55% | 1.1% | 1000 | No | 28000 |
| Inv. MEP 2 | 5% | 25% | 1.3% | 1000 | No | 38900 |
| Inv. MEP 3 | 5% | 45% | 2.3% | 3000 | No | 27500 |
| Inv. MEP 4 | 9% | 30% | 2.7% | 3000 | No | 23100 |
| Inv. MEP 5 | 5% | 55% | 2.8% | 5000 | No | 29500 |
| Inv. MEP 6 | 5% | 55% | 2.8% | 10000 | No | 27800 |
| Inv. MEP 7 | 12% | 30% | 3.6% | 3000 | No | 29300 |
| Inv. MEP 8 | 12% | 35% | 4.2% | 3000 | No | 11300 |
| Inv. MEP 9 | 5% | 45% | 2.3% | 3000 | No | 13900 |
| Comp. MEP 1 | 1% | 55% | 0.6% | 1000 | No | Gel |
| Comp. MEP 2 | 5% | 18% | 0.9% | 1000 | No | Gel |
| Comp. MEP 3 | 14% | 25% | 3.5% | 5000 | Yes | 16700 |
| Comp. MEP 4 | 10% | 45% | 4.5% | 3000 | Yes | 26100 |
| Comp. Blend 1 | N/A | N/A | N/A | N/A | N/A | Gel |

*by dry weight, based on total dry weight of the multistage emulsion polymer
**as polymerized units, by dry weight, based on total dry weight of the second polymer shell
***as polymerized units, by dry weight, based on total dry weight of the multistage emulsion polymer TABLE 7 below summaries the evaluation of coating compositions.

As TABLE 7 illustrates, all Inventive Compositions 1-4 meet performance requirement, and exhibit good mechanical stability (i.e., no grits were observed).

Comparative Compositions 1 to 3 were not stable as they became gelled (i.e., grits were observed) around several minutes after the letdown phase. By contrast, Inventive Compositions 1 to 4 showed good mechanical stability (i.e., no grits were observed), after being applied to a substrate. Therefore, the inventive examples made coating compositions more stable than the comparative examples when equivalent amount of dispersant and binder was used in the comparative examples.

Comparative Composition 4 was prepared under a traditional coating preparation process, which was used as a control sample for performance benchmark. Comparative Composition 4 has a volume of solids of 35%. By contrast, Inventive Composition 4 achieved a higher volume of solids of 40.7% because the inventive multistage aqueous emulsion polymer contained extra water so that less water was required in the grind phase. Therefore, the present invention not only could simplify the preparation process (i.e., without adding binder and changing mixer in the letdown phase), but also may achieve a higher volume of solids, if desired, than conventional coating.

TABLE 7

Evaluation of Coating Compositions

| Coating Compositions | Mechanical Stability (by visual) | Volume of Solids |
| --- | --- | --- |
| Inventive Composition 1 | No Grits | 31.4% |
| Inventive Composition 2 | No Grits | 31.4% |
| Inventive Composition 3 | No Grits | 31.4% |
| Inventive Composition 4 | No Grits | 40.7% |
| Comparative Composition 1 | Grits | 31.15% |
| Comparative Composition 2 | Grits | 31.15% |
| Comparative Composition 3 | Grits | 31.15% |
| Comparative Composition 4 | No Grits | 35% |

What is claimed is:

1. A multistage aqueous emulsion polymer comprising:
from 88% to 98% by dry weight, based on total dry weight of the multistage aqueous emulsion polymer, of a first polymer core,
from 2% to 12% by dry weight, based on total dry weight of the multistage aqueous emulsion polymer, of a second polymer shell,
wherein the first polymer core and the second polymer shell each independently comprises, as polymerized units, one or more ethylenically unsaturated nonionic monomers,
wherein the second polymer shell further comprises, as polymerized units, from 20% to 60% by dry weight, based on total dry weight of the second polymer shell, of an acid monomer,
wherein said acid monomer is, as polymerized units, from 1.1% to 4.2% by dry weight, based on total dry weight of the multistage aqueous emulsion polymer,
wherein the multistage aqueous emulsion polymer has a Brookfield viscosity of 11,300 to 38,900 centipoise.

2. The multistage aqueous emulsion polymer according to claim 1, wherein said multistage aqueous emulsion polymer comprises from 2% to 9% by dry weight, based on total dry weight of the multistage aqueous emulsion polymer, of a second polymer shell.

3. The multistage aqueous emulsion polymer according to claim 1, wherein said second polymer shell comprises, as polymerized units, from 25% to 55% by dry weight, based on total dry weight of the second polymer shell, of an acid monomer.

4. The multistage aqueous emulsion polymer according to claim 1, wherein said acid monomer is, as polymerized units, from 1.3% to 3.6% by dry weight, based on total dry weight of the multistage aqueous emulsion polymer.

5. The multistage aqueous emulsion polymer according to claim 1, wherein the second polymer shell has an acid number from 130 to 390.

6. The multistage aqueous emulsion polymer according to claim 1, wherein the second polymer shell has an acid number from 162 to 358.

7. The multistage aqueous emulsion polymer according to claim 1, wherein the first polymer core comprises, as polymerized units, from 0.01% to 5% by dry weight, based on total dry weight of the first polymer core, of an acid monomer.

8. The multistage aqueous emulsion polymer according to claim 1, wherein the first polymer core comprises, as polymerized units, from 0.01% to 5% by dry weight, based on total dry weight of the first polymer core, of a stabilizer monomer.

9. The multistage aqueous emulsion polymer according to claim 1, wherein the second polymer shell has a calculated Mn from 1000 to 10000.

10. The multistage aqueous emulsion polymer of claim 1 wherein the second polymer shell has a calculated Mn from 1000 to 5000.

11. An aqueous coating composition comprising the multistage aqueous emulsion polymer according claim 1.

12. The coating composition of claim 11 further comprising a pigment and wherein the multi-stage aqueous emulsion polymer acts as a dispersant during a grind stage mixing of the pigment and the polymer under high shear to form a stable aqueous dispersion of dis-agglomerated pigment and as a binder for the coating composition.

13. The coating composition of claim 11 wherein a coating made from the composition does not blister when immersed in water for 24 hours.

* * * * *